United States Patent [19]

Mason, Jr. et al.

[11] 4,140,889

[45] Feb. 20, 1979

[54] COOKING VESSEL FOR MICROWAVE OVEN COOKERY ADAPTED TO AID IN BROWNING FOODS BY HEAT FROM HOT, LIQUID FATS

[76] Inventors: Stanley I. Mason, Jr.; Charlotte G. Mason, both of 61 River Rd., Weston, Conn. 06880

[21] Appl. No.: 813,952

[22] Filed: Jul. 8, 1977

[51] Int. Cl.$^2$ .............................................. H05B 9/06
[52] U.S. Cl. ................................ 219/10.55 E; 99/444
[58] Field of Search .................. 219/10.55 E, 10.55 R; 99/444, 445, 446; D7/128, 85, 96, 97, 130, 131, 23, 27, 1, 3, 20, 87, 47

[56] References Cited

U.S. PATENT DOCUMENTS

| | | | |
|---|---|---|---|
| D. 117,732 | 11/1939 | Hobson | D7/97 |
| D. 126,554 | 4/1941 | Fletcher | D7/97 |
| D. 129,653 | 9/1941 | Hennessy | D7/97 |
| D. 229,656 | 12/1973 | Garcia | D7/97 X |
| D. 246,627 | 12/1977 | Sugiyama | D7/85 |
| 2,830,162 | 4/1958 | Copson et al. | 219/10.55 E |
| 3,941,968 | 3/1976 | MacMaster | 219/10.55 E |
| 3,946,188 | 3/1976 | Derby | 219/10.55 E |
| 3,985,990 | 10/1976 | Levinson | 219/10.55 E |
| 3,994,212 | 11/1976 | Wong | 219/10.55 E |

FOREIGN PATENT DOCUMENTS 618546  4/1961  Canada .............................. 219/10.55 E

OTHER PUBLICATIONS

Nupac Circular, Rec. 8-12-77.

Primary Examiner—Arthur T. Grimley
Attorney, Agent, or Firm—Haynes N. Johnson

[57] ABSTRACT

An apparatus is provided for cooking and browning foods such as roasts, fowl, hams and bacon, etc. in a microwave oven. The meat to be cooked is supported on ribs on the upper surface of a cooking vessel, the ribs defining grooves for the flow of liquid fat drippings from the meat being cooked. The grooves cover most of the upper surface of the vessel and so underlie most of the surface of the meat. They feed into a channel leading into a main reservoir.

Fat absorbs more energy from microwave radiation than meat and so reaches a high temperature far more quickly than the meat. The presence of the fat, as a result, reduces absorption of direct and reflected microwave energy by the leaner meat, and so should be conducted away from directly below or around the meat area, to a position remote as possible from the meat.

The vessels of this invention conduct liquified fat from the meat, so the meat is not shielded, and use the fat as a source of heat for the air in the oven. This serves to encourage browning of the meat. This means that foods such as roasts can be cooked in a microwave oven and yet have the appearance and taste appeal of foods cooked in a customary oven. It also permits faster cooking.

Additionally, the heat from the fat is transmitted through the vessel and into an inner chamber underneath. This permits the cooking vessels to be used also as serving vessels which keep the food warm.

22 Claims, 15 Drawing Figures

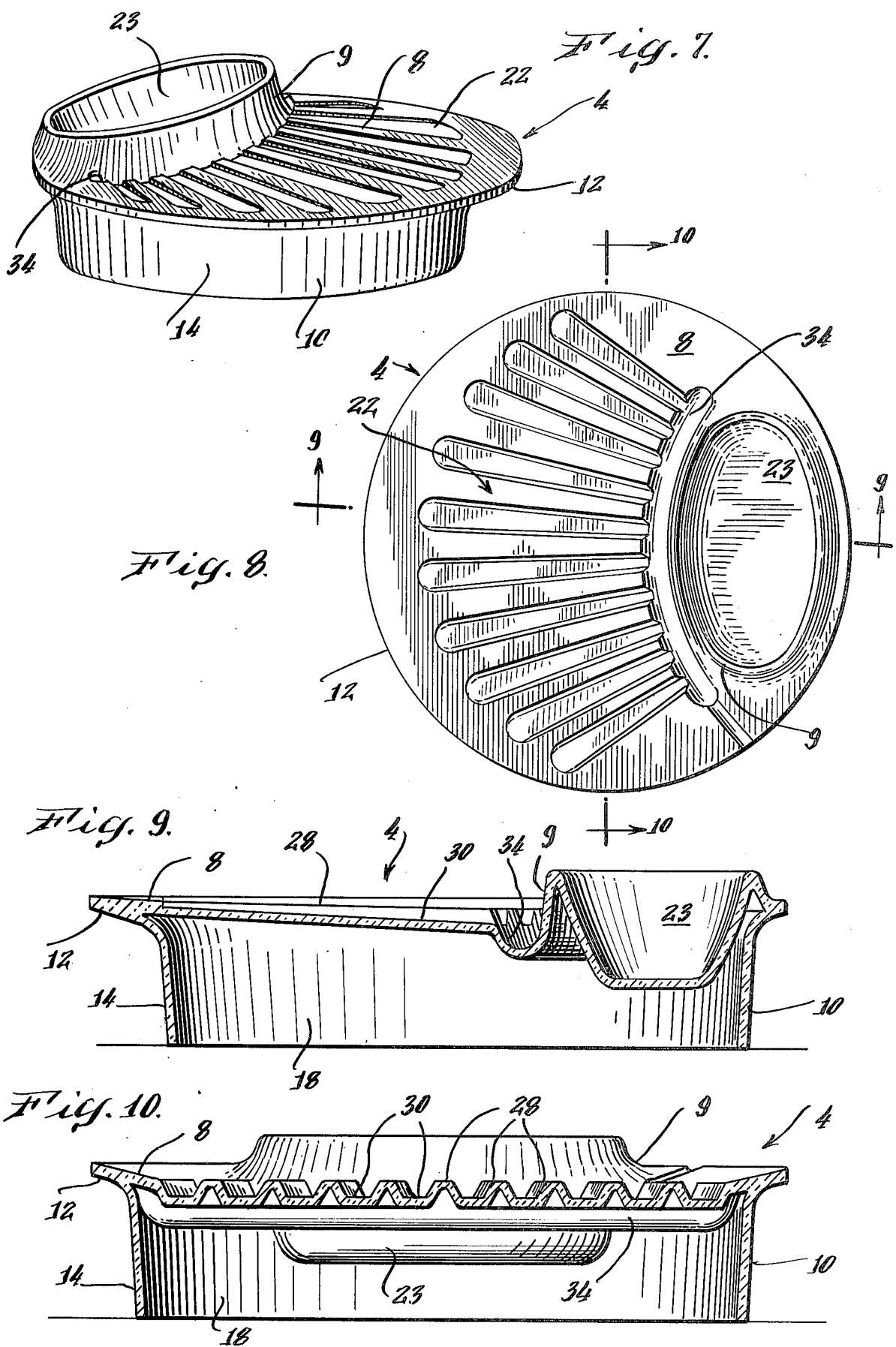

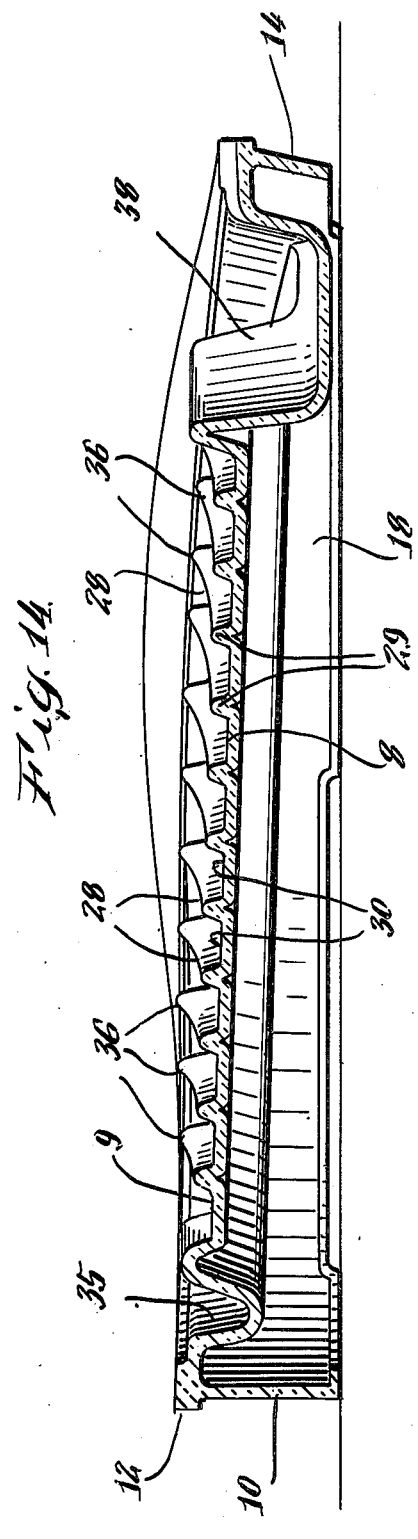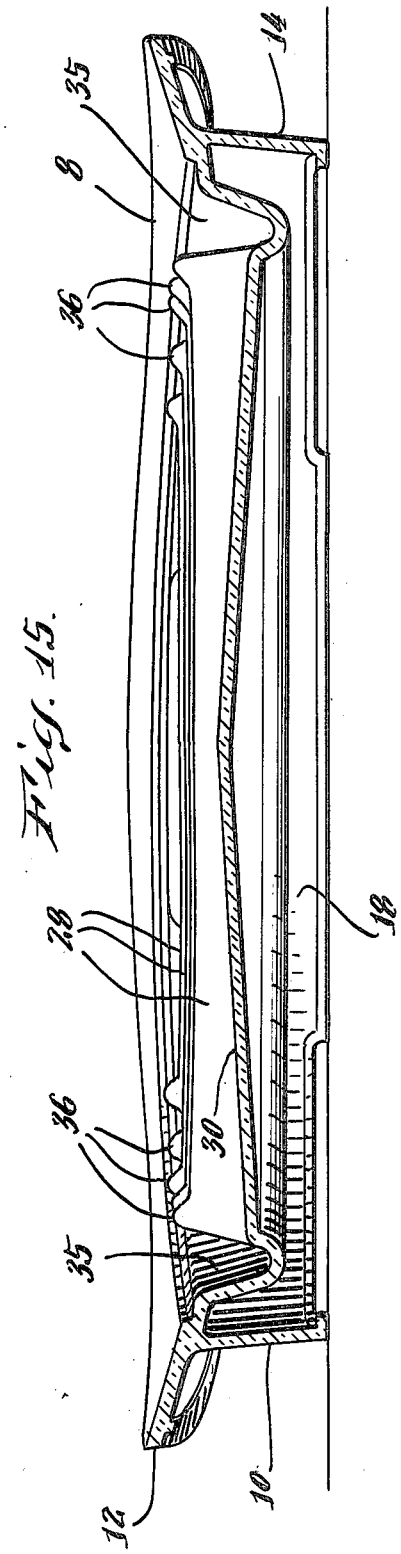

COOKING VESSEL FOR MICROWAVE OVEN COOKERY ADAPTED TO AID IN BROWNING FOODS BY HEAT FROM HOT, LIQUID FATS

BACKGROUND OF THE INVENTION

Microwave ovens are becoming more and more widely used in both homes and restaurants.

Such ovens, however, often do not take full advantage of reflected microwave radiation in cooking and do not brown the meat on the outside as well as they might. Efforts to solve this have included partially cooking the food in a microwave oven and finishing the cooking in a normal oven, or cooking the food in the usual way, freezing it, and using the microwave oven only for thawing and heating.

Browning of meats can be partially accomplished by the present cooking vessel without absolute need for a second step.

SUMMARY OF THE INVENTION

This present invention provides a method and apparatus for cooking foods in a microwave oven and giving them the palatability people are accustomed to from normal oven cooking. It utilizes the fact that liquid fat drippings from foods such as meat absorb more energy and so reach far higher temperatures in the presence of microwaves than does the meat itself (for example 400° F. as compared to 150° F.). Consequently, with a properly structured cooking vessel, the liquid fat drippings are removed from the area beneath the foods, are heated by electrical microwave energy, and in turn, heat the air in the oven to heat the exterior of the meat to encourage browning.

The cooking vessel includes a base and top and a series of food-supporting ribs across the upper surface of the top. The food rests upon the ribs during and, if desired, after cooking. These ribs define grooves between them on the upper surface. The grooves slope gently toward either a remote reservoir, or a channel leading into a remote reservoir, in the cooking vessel, and so carry the hot fat away from the meat.

The vessel has downwardly extending sides, defining a chamber. The heat from the hot liquid fat in the grooves, channel, and reservoir is carried through the upper surface of the vessel to warm the air in the chamber below.

The vessel may be made from any suitable material usable in microwave ovens and should also be usable in ordinary ovens. Preferably, it is made of a metal-free stoneware body, since such stoneware is virtually transparent to microwaves, is strong, can stand temperatures beyond 600° F., and has a good appearance so the vessel may also be used for serving at the table.

In use, the food to be cooked is placed on the vessel and supported by ribs. The ribs hold the food above the grooves in the upper surface of the vessel so that it will not obstruct the flow of fat through the channels. As the food is heated by microwave radiation, liquid fat drips from the food and into the grooves below. It flows down the grooves, into the channels, if used, and then enters a remote reservoir.

The fat, being liquid, will absorb considerably more microwave energy (on a volume basis) than does the food or the ambient air inside of the oven. The fat, therefore, reaches a considerably higher temperature than the food or air. For example, when roasting pork to a serving and eating degree of "doneness", the fat has been found to reach 400° F. while the roast itself reaches only 150°.

As the heated fat flows down the grooves underneath the food, heat from the fat is radiated to the food and assists in cooking; further, the surrounding air is heated through convection; the hot air assists in browning the surface of the meat.

More importantly, when the liquid fat accumulates in the reservoir, it continues to receive microwave energy and remains at, or increases, its high temperature. In turn, it heats the air in the oven which enhances the browning of the food.

Since the sidewalls of the vessel define a chamber in the hollow region beneath the upper surface of the vessel, heat from the hot liquid fat is also transmitted through the dish to the air confined in the chamber underneath, further heating the air confined therein. As a result, the cooking vessel may also be used as a serving dish; and the heated air in the chamber will assist in keeping the food warm.

BRIEF DESCRIPTION OF THE DRAWINGS

FIG. 7 is a perspective view of a second embodiment of the invention.

FIG. 8 is a top plan view of this embodiment.

FIG. 9 is a vertical sectional view of the embodiment looking in the direction of the arrows 9 on FIG. 8. It shows horizontal ribs, sloping grooves, and a channel on one side.

FIG. 10 is a vertical sectional view of this embodiment looking in the direction of arrows 10 on FIG. 8.

FIG. 14 is a sectional view of this embodiment looking in the direction of the arrows 14 on FIG. 11.

FIG. 15 is a sectional view of this embodiment looking in the direction of the arrows 15 on FIG. 11.

DESCRIPTION OF THE PREFERRED EMBODIMENTS

A First Embodiment

Figure 1:
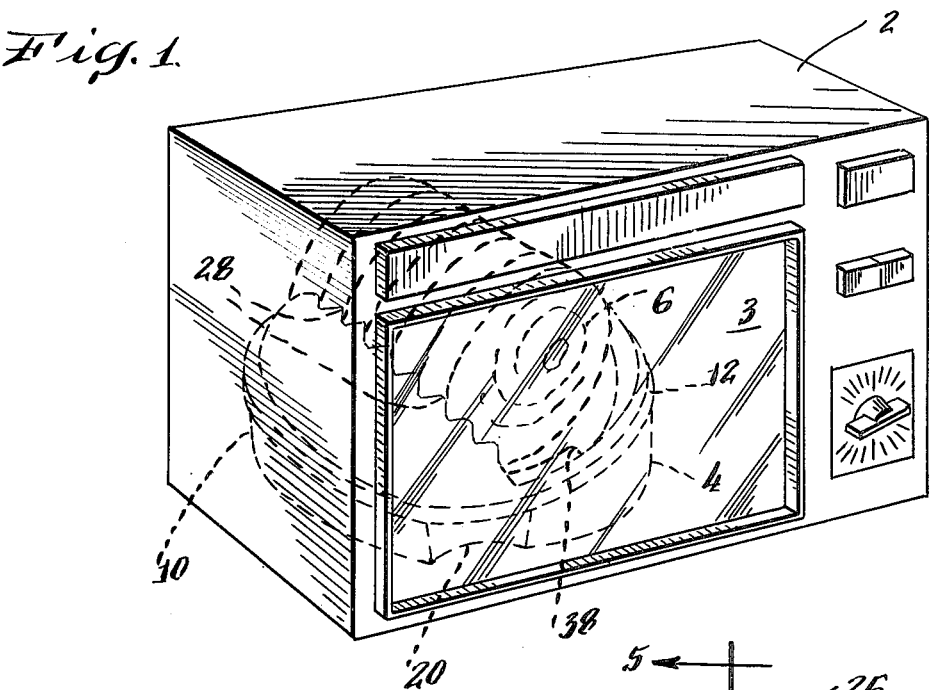
FIG. 1 is a perspective view of one embodiment of the invention, positioned inside of a microwave oven and holding a roast.

Turning to the drawings, FIG. 1 is a perspective view of a customary microwave oven 2 with a window 3 in front. A cooking vessel 4 carrying a roast 6 may be seen through window 3. Those portions of the cooking vessel and of the roast which would not be seen through the window are shown in dotted lines.

One embodiment of cooking vessel 4 is shown in FIGS. 1 through 6. The broad configurations of the structure are probably best seen initially in FIGS. 3 and 5. The vessel 4 is a hollow, stoneware unit having a top portion 9 with an upper surface 8 monolithically formed with a base 10. Base 10 includes an upper rim 12 and a downwardly extending circular skirt 14. Skirt 14 may have inwardly turned flanges 16 at its bottom to provide more of a support surface, but the bottom portion is generally open. Thus, top 9 with its upper surface 8 and base portion 10 are integral together and define an inner chamber 18.

Turning to the configuration of upper surface 8, it has a food holding portion that is generally arcuate and semi-cylindrical in appearance (concave as viewed from above), and outer walls 26. The outer walls 26 connect with the base 10 along the rim 12.

The food holding portion of upper surface 24 includes ribs 28 extending above surface 24 and defining grooves 30 between them. The grooves 30 lead to a channel 32 at their lower-most portion which, in turn, feeds into a reservoir 38.

Since the ribs 28 extend above upper surface 24, the food, such as roast 6, rests upon the ribs and is raised above the bottom of grooves 30. Ribs 28 are generally narrow or pointed (triangular in cross-section) so that the area of ribs 28 actually in contact with the roast 6 is relatively small compared to the area of the surface of roast 6 which is above grooves 30. The pointed cross-sectional nature of ribs 28 and the relative surface areas is shown by noting the points 29 on the ribs 28.

Grooves 30 are adapted to receive liquids such as liquid fat drippings from a roast, or fluids used for basting the food being cooked. The grooves are sloped so that the drippings will drain down the grooves 30 into channel 32; and channel 32 is sloped to cause the drippings to drain into reservoir 38. Reservoir 38 is preferably positioned remote from roast 6, i.e., not underneath the roast. Ribs 28 should have a height above the bottom of grooves 30 sufficient to permit the flow of the liquid fat through the grooves without being obstructed by the food.

Figure 2:
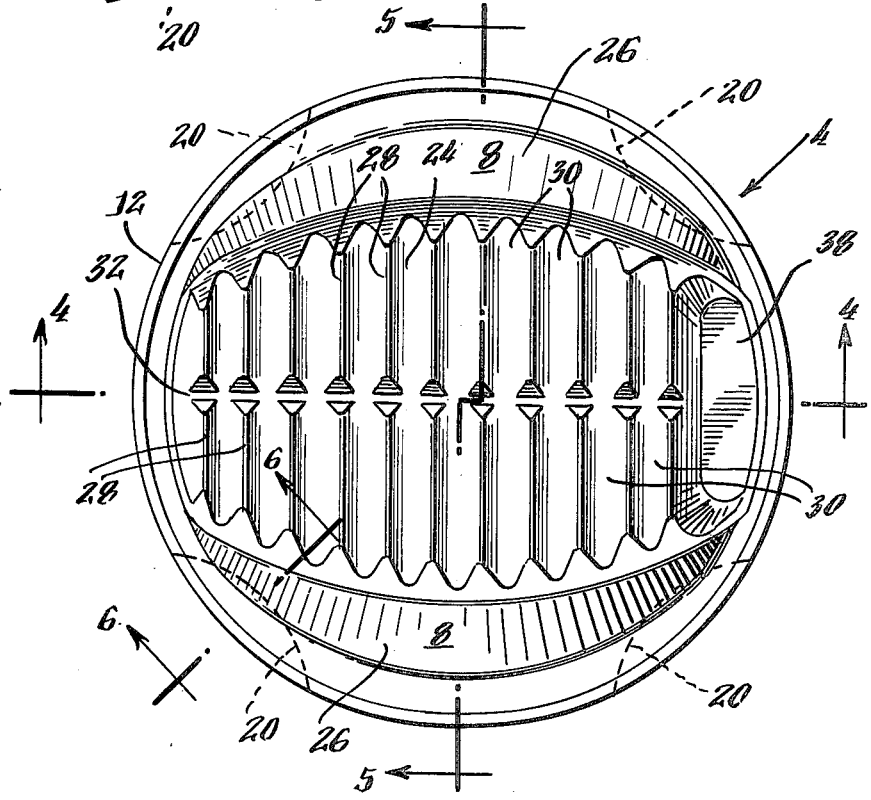
FIG. 2 is a top plan view of this embodiment.
Figure 3:
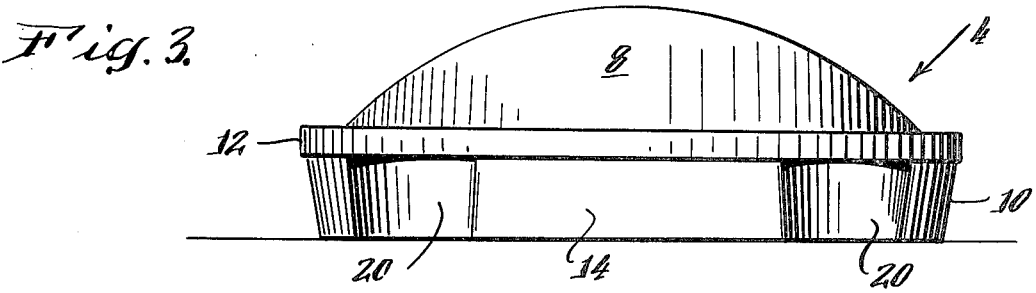
FIG. 3 is a side elevational view of this embodiment.
Figure 4:
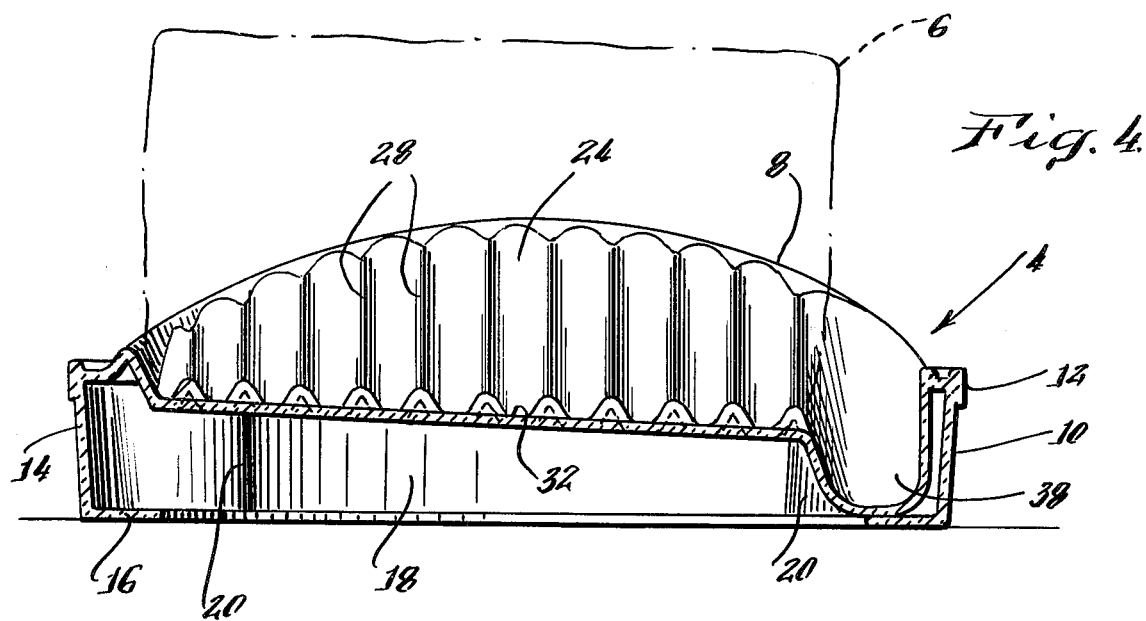
FIG. 4 is a vertical sectional view of this embodiment looking in the direction of the arrows 4 on FIG. 2. It shows the ribs, grooves, and reservoir.
Figure 5:
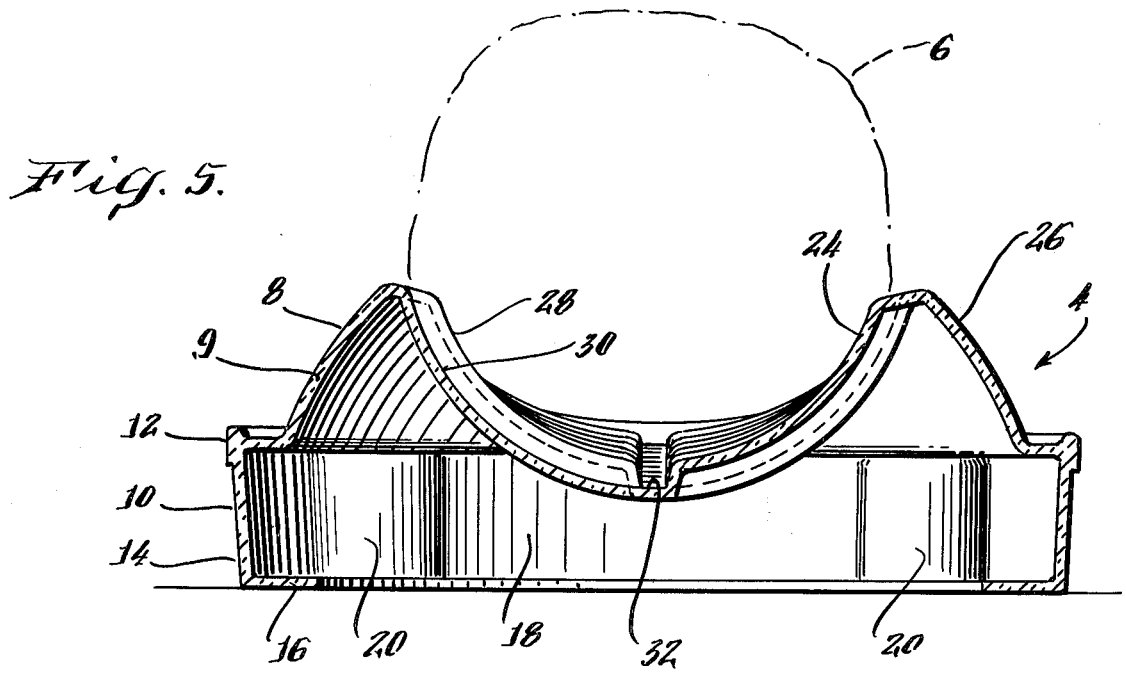
FIG. 5 is a vertical sectional view of this embodiment looking in the direction of the arrows 5 on FIG. 2. A roast is shown (in dotted outline) supported by the ribs. Note that the ribs are arcuate in shape and form a generally concave, cylindrical supporting surface and that there is a centrally-located channel.
Figure 6:
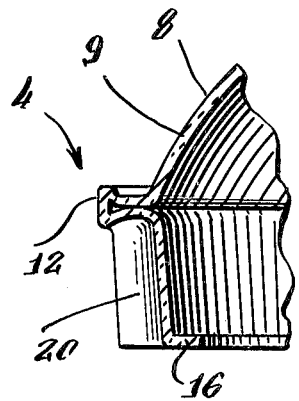
FIG. 6 is a partial sectional view of this embodiment looking in the direction of the arrows 6 on FIG. 2. It shows one of several undercut portions that may be provided for handholds.
Figure 11:
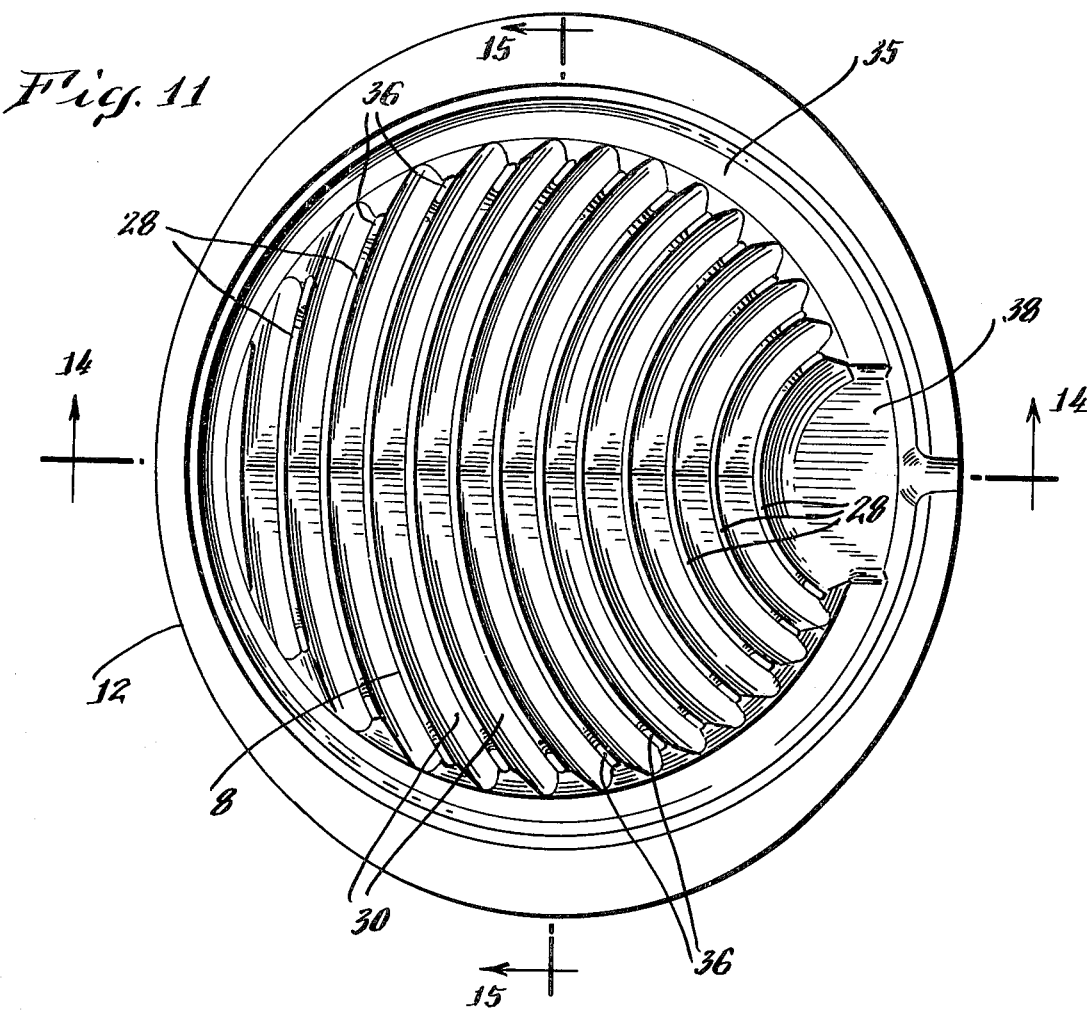
FIG. 11 is a top plan view of a third embodiment of the invention in which the grooves slope to the side and the receiving channel is along the periphery.
Figure 12:
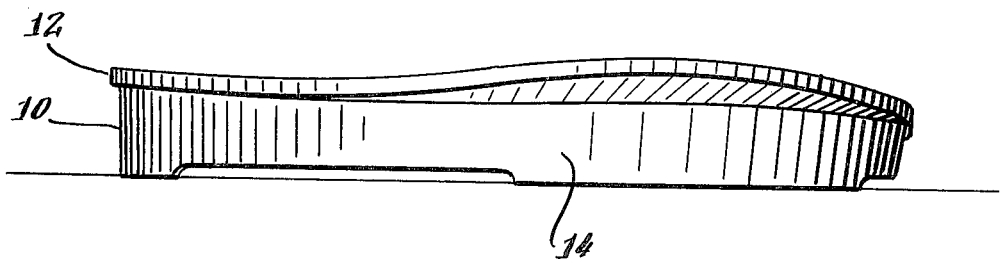
FIGS. 12 and 13 are side elevational views of this embodiment.
Figure 13:
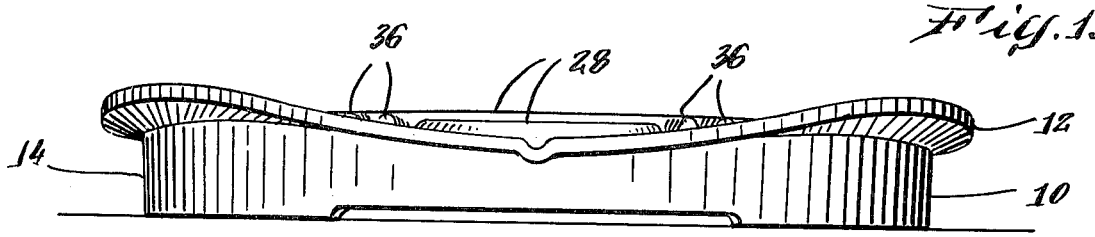

If desired, skirt 14 may include several indented portions 20 (see FIGS. 2 and 6). These will permit the user to reach under the rim 12 and use rim 12 as a handle for carrying vessel 4.

The cooking vessel 4, shown by FIGS. 1 to 6 is used as follows:

A roast 6 is placed on the upper surface 24 of vessel 4 and rests upon the upper tips 29 of ribs 28, above the downwardly sloping grooves 30. Vessel 4 may then be picked up by rim 12 at the indented portion 20 and placed in microwave oven 2.

Microwave radiation in the oven 2 heats the food, such as roast 6; and when the roast has reached a high enough temperature, the food is considered "cooked". For a roast of pork the "cooked" temperature is approximately 150° F. Meanwhile, while its temperature is increasing, fat on the roast drips from it into grooves 30 and flows down them into channel 32 and then into reservoir 38. This removes much of the free fat from the meat, so a greater percentage of microwave radiation reaches the lean meat itself without being absorbed by the fat.

Radiation in a microwave oven reaches the food both directly and by reflection within the oven. By having the vessel 4 elevated ¾" to 2", by skirt 14 of base 10, more reflected radiation will reach the underside of the meat. This will promote faster cooking.

Liquid fat and other liquids (such as from basting) normally absorb significantly more energy from microwave radiation than the food being cooked; and the surrounding air absorbs but little if any of the energy. The liquid fat in remote reservoir 38 continues to receive microwave radiation, often radiation that would not reach the roast itself. Thus, it reaches a relatively high temperature. This heats the ambient air which then circulates in the oven by convection. Such serves to brown the meat being cooked and also contributes to the capacity of the oven to cook the food evenly. If fat is removed from the reservoir, the energy will redirect itself more to the meat; for there is no fat to "steal" the energy.

The liquid fat in grooves 30, channel 32, and reservoir 38 also transmits heat energy through the upper surface 8 of vessel 4 and into the hollow inner channel 18 thereunder. This serves to heat the air within the chamber. As a result, if vessel 4 is later used as a serving dish, the heated air within chamber 18 helps to keep the food warm after the vessel has been removed from the oven.

It is best that the width of the grooves 30 be greater than the width of the ribs 28. By increasing the width of the grooves (correspondingly decreasing the width of the ribs), the exposed surface area of the roast, i.e., that portion not in contact with ribs 28, is increased. This permits the fat to more quickly leave the surface of the roast and be removed, and so, it is believed, will increase the total microwave energy absorbed by the roast. Thus, by having the ribs as narrow as possible relative to the grooves, a greater area of the roast is more quickly exposed for cooking. Also, as mentioned above, having points 29 on the upper edges or ribs 28 is also a means of increasing the exposed surface area of the meat.

Though this invention is being described as using liquid fat drippings from meats, the liquid could be something else, such as basting liquids and so, for simplicity, the term "liquid fat" or similar expressions will be used herein to encompass other such liquids.

A Second Embodiment

FIGS. 7, 8, 9 and 10 show another embodiment of the present invention which is particularly adapted for microwave cooking of bacon and eggs, frankfurters and baked beans, or other combination foods. For convenience, the same number have been given to the corresponding parts where apposite.

The dish or vessel 4 has a base 10 with a rim 12 and supporting skirt 14. The top portion 9, with its upper surface 8, in this embodiment, has two recessed food holding sections 22 and 23, for bacon and eggs respectively. Top portion 9 is integral with base 10.

A series of ribs 28 protrude upwardly from surface 8 in recessed section 22. The ribs 28 define a series of downwardly sloping grooves 30 between the ribs. This is similar to the rib-groove structure of the earlier described embodiment, except that the upper surface of the ribs 28 generally defines a plane rather than an arcuate surface.

The surface area of portion 22, as shown in FIGS. 7 and 8, is crescent-shaped. The grooves 30 slope downwardly and inwardly towards portion 23 to channel 34, positioned adjacent to portion 23.

The bacon to be cooked is laid across and supported by the ribs 28. As the bacon is cooked by microwave radiation, liquid fat drips into and flows down grooves 30 to reservoir 38 and becomes much hotter than the bacon. Heat from this liquid fat heats the air and cooks the bacon in much the same manner described for the previously-discussed embodiment. The capability of the vessel to cook the bacon can be enhanced by increasing the width of the grooves relative to the width of the ribs.

Unlike the first embodiment shown, this embodiment does not require the channel 34 to slope towards a reservoir, for the channel itself acts as a reservoir and is sufficiently deep to accommodate the anticipated quantity of liquid fat.

Base 10 and surface 8 of recess 22 define a hollow, inner chamber 18 (see FIGS. 9 and 10). As with the first embodiment of the invention, heat from the liquid fat on the upper surface 8 is transmitted to inner chamber 18, heating the air therein.

A recessed, egg cooking section 23 is formed in upper surface 8 adjacent to the bacon section 22. Section 23 is recessed into inner chamber 18 and may be heated by the air in chamber 18.

Eggs may be placed in the recess 23 and cooked in the microwave oven while the bacon is cooking. If, as is often the case, eggs cook more quickly than bacon, they may be added after the bacon is partially cooked.

After the bacon and eggs are cooked and the vessel 4 is removed from the oven, the heated air within inner chamber 18 serves to keep the bacon and eggs warm; and they may be eaten directly from vessel 4. Also, if desired, vessel 4 may include an interfitting top (not shown) to further prevent cooling of the food.

A Third Embodiment

FIGS. 11 to 15 illustrate a third embodiment of the invention useful for cooking items such as chops and fish. Here the grooves slope in two directions toward the periphery of the dish, to a receiving channel; and the channel slopes towards a reservoir at one end. The ribs extend upwardly from the upper surface, and preferably, except for their outer ends, have their upper edges in a common plane.

This embodiment is, functionally, substantially the same as the others. It includes a base 10 with a rim 12 and surrounding skirt 14. The top 9 with upper surface 8 is generally convex (as seen from above) and includes ribs 28, defining grooves 30, and a peripheral channel 35 leading to a reservoir 38. The upper tips 29 or ribs 28 generally lie in the same plane to provide a "flat" surface for the food being cooked. The outer ends 36 of the ribs 28 may, however, be slightly raised to prevent the food from slipping into the peripheral channel 35.

As with the other embodiments, top portion 9 with its upper surface 8, is integral with base 10, and skirt 14, and define an inner chamber 18.

The food to be cooked is placed on the ribs and the dish placed in a microwave oven. As before, liquid fat drips from the food and flows down the grooves 28 to channel 32, and thence to remote reservoir 38. The food is browned in a manner similar to the other embodiments of the invention.

Similarly, the hot, liquid fat transmits heat to the air within inner chamber 18. This keeps the food on the vessel warm after the vessel is removed from the oven.

The type of food to be cooked determines which embodiment of the invention should be used. If the food is bulky in nature, such as a roast or large fowl, it is desirable to use the first embodiment. For multiple food types, such as bacon and eggs, the second embodiment is preferred. And, for foods with generally flat surfaces such as chops, the third embodiment gives best results.

If meat is to be cooked which has fat primarily around the perimeter, such as steak, a combination of the first and third embodiments may be best, i.e., a structure like the first embodiment in which the first flows towards the center, but with the upper surface of the ribs lying in a plane.

Both the first and third embodiments of the invention may be modified to include a "caudle" for basting. This could be done by providing a funnel shaped opening on the bottom surface of the reservoir. A removable, opened top container may then be positioned directly below the opening to receive liquid fat. The container is then removed and its contents poured over the food being cooked in the oven.

The design of cooking vessels using this invention may vary depending upon the type of foods and the nature of the microwave oven. They should be designed, however, to provide adequate grooves and channels and with a slope so that liquid fat or other liquid may flow to a reservoir removed from the food itself and also heat the inner chamber; and the ribs should be dimensioned and spaced to allow the meat to rapidly lose fat as it liquifies. The rib pattern on the upper surface may be varied, being parallel, concentric arcs, a maze, or otherwise, to accomplish the desired result.

As mentioned above, the vessel is preferably made of stoneware, though others may be used. In its design, the material used for the top portion should be thick enough for adequate support but thin enough relative to the heat transmissivity of the material, to permit adequate heat transmission from the hot liquid fat through the top to warm the air in the inner chamber below.

We claim:

1. A microwave oven cooking vessel adapted to utilize heat absorbed by liquid fat from food being cooked thereon to aid in remotely browning the outside of said food, said vessel constructed to utilize both direct and reflected microwave radiation to heat said food, said vessel including:

a base having a downwardly extending sidewall around the perimeter of said base, a top integral with said base and extending over said sidewall, said sidewall supporting said top, said top being of material which is transparent to microwave radiation, said base and said top defining an inner chamber below said top, and said top having an upper surface thereon, said upper surface being sloped from the horizontal and having a series of food-supporting ribs thereon, said ribs defining sloping grooves with sloping surfaces on said upper surface, said sloping grooves being positioned below said cooking food to receive liquid fat dripping therefrom, said food supporting ribs being of sufficient height so that said sloping grooves are unobstructed by said food thereabove, receiving means remote from said ribs and associated with the lower portion of said sloping grooves to receive and store said liquid fat remote from said sloping grooves, said receiving means being so positioned to heat said liquid fat stored therein by exposure thereof to microwave radiation, said sloping grooves being sufficiently inclined to rapidly transport said fat away from said cooking food and towards said remote receiving means to provide a substantially fat-free microwave transmissive portion on said upper surface below said cooking food, said downwardly extending sidewall being of sufficient height to maintain said top and said upper surface at a sufficient elevation from the floor of said microwave oven so that microwave radiation reflected from said floor of said oven can pass through said fat-free portion of said upper surface, said food supporting ribs and said sloping grooves being dimensioned relative to each other such that said grooves are wider than said ribs so that a wide surface area of said cooking food is exposed to said reflected microwave radiation and said fat can drip freely from said surface of said cooking food into said wide grooves thereunder, wherein said reflected microwave radiation penetrates said wide surface area of said food without being absorbed by liquid fat, whereby said food is cooked by direct microwave radiation, is further heated and remotely browned by heat from said liquid fat stored in said remote receiving means, and the cooking time of said food is further decreased by application of reflected microwave radiation thereto.

2. A cooking vessel as set forth in claim 1 in which said receiving means includes a channel and a remote reservoir.

3. A cooking vessel as set forth in claim 2 in which said channel is centrally located on said upper surface and said upper surface between said ribs slopes downwardly and inwardly to said channel.

4. A cooking vessel as set forth in claim 3 in which the upper edges of said ribs have an arcuate configuration.

5. A cooking vessel as set forth in claim 2 in which said reservoir has an opening on the lower surface thereof for removal of liquid fat from said reservoir.

6. A cooking vessel as set forth in claim 1 wherein said upper surface includes two recessed portions, at least one of which recessed portions includes said ribs and grooves and said receiving means and in which said inner chamber is below both of said recesses whereby food in said recess may be maintained warm by heat of said hot fat being transferred through said top into said inner chamber.

7. A cooking vessel as set forth in claim 2 in which said channel is positioned proximate to the periphery of said upper surface and the slope of said upper surface and the positioning of said ribs is sloped to cause said hot fat to pass into said channel.

8. A cooking vessel as in claim 1 in which said ribs are sufficiently high to permit the passage of liquid fat between said food supported by said ribs and said upper surface.

9. A cooking vessel as in claim 8 in which the upper edges of said ribs are pointed to optimize the exposed surface of said food.

10. A cooking vessel as in claim 1 in which said top is made of material capable of transmitting heat to warm said inner chamber.

11. A cooking vessel as claimed in claim 1 wherein said upper surface is made of a material which is heat transmissive so that heat from said liquid fat flowing down said sloping grooves passes through said upper surface to heat ambient air in said inner chamber defined therebelow.

12. A cooking vessel as claimed in claim 1 wherein said remote receiving means is made of a material which is transparent to microwaves and is so positioned and sufficiently elevated so that said microwave radiation reflected from the floor of said oven passes through said remote receiving means to penetrate and further heat said liquid fat stored therein.

13. A cooking vessel as claimed in claim 1 wherein said remote receiving means is so positioned and is made of a material which is heat transmissive so that heat from said liquid fat stored therein is transmitted to said inner chamber to heat ambient air therein.

14. A cooking vessel as claimed in claim 1 wherein said downwardly extending sidewall is made of a material transparent to microwaves.

15. A cooking vessel as claimed in claim 1 wherein said food supporting ribs are formed of material which is transparent to microwave radiation.

16. A cooking vessel to be used to hold food in a microwave oven, said oven including means for generating microwaves therein, said vessel especially adapted for cooking bacon and eggs, said vessel being adapted to utilize liquid fat from said bacon to aid in heating said food, said vessel constructed to utilize reflected microwave radiation to further cook said food, said vessel comprising:

a main body including a base portion and a top integral therewith, said top having an upper surface, said top being of material which is transparent to microwaves, a first recessed portion including a lower surface within said top for holding said eggs, a second recessed portion including a lower surface within said top for holding said bacon, said second recessed portion having ribs protruding upwardly from its associated lower surface for supporting bacon during cooking, said ribs defining a series of downwardly sloping channels therebetween, said channels being positioned to receive liquid fat from said cooking food, said channels being sufficiently sloped to quickly transport said liquid fat therefrom to provide said lower surface of said second recessed portion with a substantially fat-free microwave transmissive portion below said bacon, a remote reservoir between said recessed portions and being so positioned and so dimensioned to receive and store flow said channels and heat said fat stored therein by exposure thereof to microwave radiation, said channels being positioned below said cooking bacon to receive liquid fat drippings therefrom, said ribs being sufficiently high so that said channels are unobstructed by said bacon, said ribs and said channels being so dimensioned relative to each other that said channels are wider than said ribs so that a wide surface area of said bacon is exposed and fat can freely drip from said bacon into said wide channels thereunder, said lower surface of said second recessed portion being sufficiently elevated by said base portion so that microwave radiation reflected by the floor of said microwave oven passes through said fat-free microwave transmissive portion of said lower surface of said second recessed portion and penetrates said exposed wide surface area of said bacon, whereby said food is cooked by direct microwave radiation, is further heated and remotely browned by heat from said liquid fat stored in said remote reservoir, and the cooking time of said food is further decreased by application of reflected microwave radiation thereto.

17. A cooking vessel as claimed in claim 16 wherein said base portion and said top are made of a heat transmissive material and define a chamber for accommodating air, whereby said liquid fat flowing down said sloping channels and in said reservoir can transmit heat through said top in said second recessed portion into said chamber, thereby heating the air therein and serving to maintain the warmth of both said recessed portions.

18. A cooking vessel to be used to hold food in a microwave oven, said oven including means for generating microwaves therein, said vessel being adapted to use liquid fat from said food to aid in further heating said food, said vessel being constructed to utilize reflected microwave radiation to cook said food, said vessel including:

a main body including a base and a top, said top including at least one sloping upper surface, said top being of a material which is transparent to microwave radiation, said base elevating said top and, with said top, defining a chamber, a series of food-supporting ribs protruding upwardly from said upper surface for supporting food to be cooked, said ribs defining a series of sloping grooves on said upper surface and being of sufficient height above said upper surface to permit the passage of fat drippings between said food supported on said ribs and said upper surface, and said sloping grooves being sufficiently wide relative to said ribs so that liquid fat drips freely from said food into said grooves and a wide surface area of said food supported by said ribs is exposed to microwave radiation, said grooves being sufficiently sloped to quickly transport said liquid fat away from said food to provide a fat-free area below said food, said base being of a height sufficient to elevate said upper surface so that microwave radiation reflected from the surface of said microwave oven passes through said fat-free area of said upper surface and penetrates said exposed surface of said cooking food, a remote reservoir positioned to receive the fat drippings from said grooves and maintain said fat continually exposed to further microwave radiation, whereby heated fat drippings flow down said sloping grooves and into said reservoir and serve to heat the air in said oven and said cooking time is decreased by the application of said reflected microwave radiation to said food.

19. A cooking vessel as claimed in claim 18 in which said food-supporting ribs are parallel to one another.

20. A cooking vessel as claimed in claim 18 in which said series of ribs are formed in concentric arcs.

21. In a cooking vessel to be used in microwave cooking in which the food to be cooked is supported on ribs having grooves therebetween to receive hot fat from said food, and a remote reservoir fed by said grooves, said reservoir being positioned such that said liquid fat therein is exposed to microwave radiation and heated thereby, that improvement including:

a base portion having a top surface made of material transparent to microwave radiation with downwardly extending skirts integrally joined to said top surface to define an inner chamber, said top surface having sufficient heat transmissivity to transmit heat from said hot fat in said grooves and said reservoir to the inside of said inner chamber, said grooves being sloped to quickly transport said liquid fat to said reservoir and away from said food, wherein a fat-free portion of said top surface is provided below said food, said base being of sufficient height to elevate said tops so that microwave radiation reflected from a microwave oven passes through said fat-free portion of said top surface to penetrate said food supported thereabove, whereby the heat in said inner chamber may serve to maintain food warm after it has been cooked and removed from said stove, and the cooking time of said food is decreased by application of said reflected microwave radiation thereto.

22. In a cooking vessel as claimed in claim 21 in which said downwardly extending skirts are inset to provide handle areas for said vessel.

* * * * *

REEXAMINATION CERTIFICATE (847th)
United States Patent [19]
Mason, Jr. et al.

[11] B1 4,140,889
[45] Certificate Issued  May 3, 1988

[54] COOKING VESSEL FOR MICROWAVE OVEN COOKERY ADAPTED TO AID IN BROWNING FOODS BY HEAT FROM HOT, LIQUID FATS

[76] Inventors: Stanley I. Mason, Jr.; Charlotte G. Mason, both of 61 River Rd., Weston, Conn. 06880

Reexamination Request:
No. 90/001,317, Aug. 28, 1987

Reexamination Certificate for:
Patent No.: 4,140,889
Issued: Feb. 20, 1979
Appl. No.: 813,952
Filed: Jul. 8, 1977

[51] Int. Cl.⁴ .............................. H05B 6/80
[52] U.S. Cl. ...................... 219/10.55 E; 99/444
[58] Field of Search .............. 219/10.55 E, 10.55 F, 219/10.55 R; 99/444, 445, 446, 451, DIG. 14, 425; D7/354, 359, 409, 355, 356, 357, 1, 3, 20, 23, 27, 40

[56] References Cited
U.S. PATENT DOCUMENTS

| | | | |
|---|---|---|---|
| D. 117,732 | 11/1939 | Hobson | D7/359 |
| D. 126,554 | 4/1941 | Fletcher | D7/359 |
| D. 129,653 | 9/1941 | Hennessy | D7/409 |
| D. 229,656 | 12/1973 | Garcia | D7/359 |
| D. 246,627 | 12/1977 | Sugiyama | D7/359 |
| 1,733,450 | 10/1929 | Detwiler | 99/340 |
| 2,830,162 | 4/1958 | Copson et al. | 219/10.55 E |
| 3,941,968 | 3/1976 | MacMaster et al. | 219/10.55 E |
| 3,946,188 | 3/1976 | Derby | 219/10.55 E |
| 3,985,990 | 10/1976 | Levinson | 219/10.55 E |
| 3,994,212 | 11/1976 | Wong | 219/10.55 E |

FOREIGN PATENT DOCUMENTS

618546  4/1961  Canada ............... 219/10.55 E

OTHER PUBLICATIONS

Nupac Circular.

*Primary Examiner*—Philip H. Leung

[57] ABSTRACT

An apparatus is provided for cooking and browning foods such as roasts, fowl, hams and bacon, etc. in a microwave oven. The meat to be cooked is supported on ribs on the upper surface of a cooking vessel, the ribs defining grooves for the flow of liquid fat drippings from the meat being cooked. The grooves cover most of the upper surface of the vessel and so underlie most of the surface of the meat. They feed into a channel leading into a main reservoir.

Fat absorbs more energy from microwave radiation than meat and so reaches a high termperature far more quickly than the meat. The presence of the fat, as a result, reduces absorption of direct and reflected microwave energy by the leaner meat, and so should be conducted away from directly below or around the meat area, to a position remote as possible from the meat.

The vessels of this invention conduct liquified fat from the meat, so the meat is not shielded, and use the fat as a source of heat for the air in the oven. This serves to encourage browning of the meat. This means that foods such as roasts can be cooked in a microwave oven and yet have the appearance and taste appeal of foods cooked in a customary oven. It also permits faster cooking.

Additionally, the heat from the fat is transmitted through the vessel and into an inner chamber underneath. This permits the cooking vessels to be used also as serving vessels which keep the food warm.

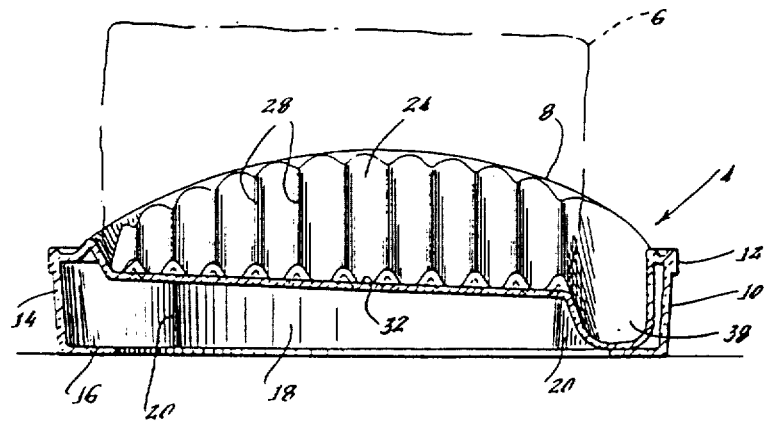

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-22 is confirmed.

* * * * *